(12) United States Patent
Demers et al.

(10) Patent No.: US 9,103,715 B1
(45) Date of Patent: Aug. 11, 2015

(54) TERAHERTZ SPECTROMETER PHASE MODULATOR CONTROL USING SECOND HARMONIC NULLING

(71) Applicant: Joseph R. Demers, North Hollywood, CA (US)

(72) Inventors: Joseph R. Demers, North Hollywood, CA (US); Bryon L. Kasper, Sierra Madre, CA (US)

(73) Assignee: Joseph R. Demers, Pasadena, CA (US)

( * ) Notice: Subject to any disclaimer, the term of this patent is extended or adjusted under 35 U.S.C. 154(b) by 0 days.

(21) Appl. No.: 14/212,542

(22) Filed: Mar. 14, 2014

Related U.S. Application Data

(60) Provisional application No. 61/789,234, filed on Mar. 15, 2013.

(51) Int. Cl.
*G01J 5/02* (2006.01)
*G01J 3/02* (2006.01)

(52) U.S. Cl.
CPC .......................................... *G01J 3/02* (2013.01)

(58) Field of Classification Search
CPC ............. G01J 3/10; G01J 3/42; G01J 3/4531; G01N 21/3581; G01N 21/39
USPC .................. 250/339.01–339.09, 341.1–341.8
See application file for complete search history.

(56) References Cited

U.S. PATENT DOCUMENTS

| | | | |
|---|---|---|---|
| 4,594,511 A | 6/1986 | Cooper et al. | |
| 5,379,110 A | 1/1995 | Matsui et al. | |
| 5,379,309 A | 1/1995 | Logan, Jr. | |
| 5,623,145 A | 4/1997 | Nuss | |
| 6,304,219 B1 | 10/2001 | Rothe et al. | |
| 6,348,683 B1 | 2/2002 | Verghese et al. | |
| 6,434,496 B1 | 8/2002 | Dong et al. | |
| 6,545,785 B1 | 4/2003 | Heflinger et al. | |
| 6,811,552 B2 | 11/2004 | Weil, Sr. et al. | |
| 6,816,647 B1 | 11/2004 | Rudd et al. | |
| 6,828,558 B1 | 12/2004 | Arnone et al. | |
| 6,844,552 B2 | 1/2005 | Zhang et al. | |
| 6,849,852 B2 | 2/2005 | Williamson | |
| 6,865,014 B2 | 3/2005 | Ciesla et al. | |
| 6,957,099 B1 | 10/2005 | Arnone et al. | |

(Continued)

FOREIGN PATENT DOCUMENTS

| EP | 1233527 | 8/2002 |
|---|---|---|
| GB | 2381121 | 4/2003 |

(Continued)

OTHER PUBLICATIONS

Lie et al., "Generation of widely tunable fourier-transform-limited terahertz pulses using narrow band near-infrared laser radiation," 2009, Journal of Molecular Spectroscopy, vol. 256, pp. 111-118.*

(Continued)

*Primary Examiner* — Kiho Kim
(74) *Attorney, Agent, or Firm* — Pritzkau Patent Group, LLC

(57) ABSTRACT

Apparatus for analyzing, identifying, or imaging a target is configured to avoid and/or prevent nulls that may occur periodically during a terahertz sweep. Exemplary apparatus may utilize a second harmonic lock-in amplifier to generate an error signal used to adjust a DC bias of a phase modulator to maintain an in-phase relationship between beams to avoid nulls in an output signal during frequency sweeping.

13 Claims, 5 Drawing Sheets

(56) References Cited

U.S. PATENT DOCUMENTS

| | | | |
|---|---|---|---|
| 7,126,078 | B2 | 10/2006 | Demers et al. |
| 7,174,037 | B2 | 2/2007 | Arnone et al. |
| 7,244,934 | B2 | 7/2007 | Arnone et al. |
| 7,269,359 | B1 * | 9/2007 | McAdoo .................. 398/205 |
| 7,291,835 | B2 | 11/2007 | Overney |
| 7,291,839 | B1 * | 11/2007 | Demers et al. ............ 250/341.1 |
| 7,335,883 | B2 | 2/2008 | Wallace et al. |
| 7,439,511 | B2 | 10/2008 | Demers |
| 7,485,863 | B2 | 2/2009 | Cole |
| 7,535,005 | B2 | 5/2009 | Demers |
| 7,781,736 | B2 | 8/2010 | Logan, Jr. et al. |
| 7,804,069 | B2 | 9/2010 | Tribe |
| 7,936,453 | B2 | 5/2011 | Logan, Jr. et al. |
| 7,963,571 | B2 | 6/2011 | Martin |
| 8,138,477 | B2 | 3/2012 | Gregory |
| 8,604,433 | B2 | 12/2013 | Logan, Jr. et al. |
| 2003/0155512 | A1 | 8/2003 | Arnone et al. |
| 2004/0065831 | A1 | 4/2004 | Federici et al. |
| 2005/0162658 | A1 | 7/2005 | Pepper |
| 2006/0084180 | A1 | 4/2006 | Paldus et al. |
| 2006/0214107 | A1 | 9/2006 | Mueller |
| 2006/0255277 | A1 | 11/2006 | Cole et al. |
| 2008/0179519 | A1 | 7/2008 | Andonian et al. |
| 2008/0179528 | A1 | 7/2008 | Demers |
| 2008/0212974 | A1 | 9/2008 | Davies et al. |
| 2008/0251720 | A1 | 10/2008 | Xu et al. |
| 2009/0015843 | A1 | 1/2009 | Demers et al. |
| 2009/0066948 | A1 | 3/2009 | Karpowicz et al. |
| 2009/0091820 | A1 | 4/2009 | McCarthy et al. |
| 2009/0180122 | A1 | 7/2009 | Federici |
| 2009/0200472 | A1 | 8/2009 | Gregory |
| 2009/0283680 | A1 | 11/2009 | Logan, Jr. et al. |
| 2010/0080505 | A1 | 4/2010 | Sartorius et al. |
| 2010/0092183 | A1 | 4/2010 | Kim et al. |
| 2010/0171835 | A1 | 7/2010 | Kasai et al. |
| 2011/0032955 | A1 | 2/2011 | Daiber |
| 2011/0068268 | A1 | 3/2011 | Heidari |
| 2012/0075477 | A1 | 3/2012 | Daly et al. |
| 2012/0326039 | A1 | 12/2012 | Demers et al. |
| 2013/0200263 | A1 | 8/2013 | Logan et al. |
| 2014/0021351 | A1 | 1/2014 | Logan et al. |
| 2014/0043612 | A1 | 2/2014 | Logan, Jr. et al. |

FOREIGN PATENT DOCUMENTS

| | | |
|---|---|---|
| GB | 2483118 | 2/2012 |
| WO | WO 2007/135382 A2 | 11/2007 |
| WO | WO 2009/082820 A1 | 7/2009 |
| WO | WO 2009/137263 A2 | 11/2009 |
| WO | WO 2009/137263 A3 | 1/2010 |

OTHER PUBLICATIONS

Fatome et al., "Multiple four-wave mixing in optical fibers: 1.5-3.4-THz femtosecond pulse sources and real-time monitoring of a 20-GHz picosecond source," 2010, Optics Communications, Vo. 283, pp. 2425-2429.*

U.S. Appl. No. 14/183,088, filed Feb. 18, 2014, Demers et al.
U.S. Appl. No. 14/262,249, filed Apr. 25, 2014, Demers et al.
U.S. Appl. No. 14/262,291, filed Apr. 25, 2014, Demers et al.
Brown, "Advancements in Photomixing and Photoconductive Switching for THz Spectroscopy and Imaging," *Proc. of SPIE*, 2013; 7938:793802-1-793802-16.
Intellectual Property Office Search Report for Application No. GB10170462 dated Nov. 16, 2010; 1 page.
U.S. Appl. No. 61/789,234, filed Mar. 15, 2013, Demers et al.
Arnone et al., "Applications of Terahertz (THz) Technology to Medical Imaging," *Proc. SPIE Terahertz Spectroscopy Applicat. II*, 1999; 3823:209-219.
Arnone et al., "Terahertz Imaging Comes Into View," *Phys. World*, 2000; pp. 35-40.
Bartels et al., "Femtosecond Time-Resolved Optical Pump-Probe Spectroscopy at Kilo Rates Over Nanosecond-Time-Delays Without Mechanical Delay Line," *Appl. Phys. Lett.*, 2006; 88:04117.
Bartels et al., "High-Resolution THz Spectrometer with kHz Scan Rates," *Optics Express*, 2006; 14(1):430-437.
Bjanason et al., "ErAs:GaAs Photomixer with two decades tenability and 12 µW Peak Output," *Applied Physics Letters*, 2004; 85(18):3983-3985.
Brown et al., "Characterization of a Planar Self-Complementary Square-Spiral Antenna in the THz Region," *Microwave and Optical Technology Letters*, Mar. 2006; 48(3):524-529.
Chang et al., "Power Scalable Compact THz System Based on an Ultrafast Yb-doped Fiber Amplifier," *Optics Express*, 2006; 14(17):7909-7913.
Chen et al., "Spectroscopic Applications and Frequency Locking of THz Photomixing with Distributed-Bragg-Reflector Diode Lasers in LowTemperature-Grown GaAs," *Appl. Phys. Lett.*, 1997; 71(12):1601-1603.
Combined Search and Examination Report for Application No. GB1309663.1 dated Nov. 13, 2013; 8 pgs.
Demers et al., "An Optically Integrated Coherent Frequency-Domain THz Spectrometer with Signal-to-Noise Ratio up to 80 dB," 2007 IEEE Conference; pp. 92-95.
Demers et al., "Field-portable THz Spectrometer for Characterization of Explosives and Chemicals," IEEE IRMMW Conference, Houston, TX, Oct. 6, 2011; 26 pgs.
Gutierrez, "An Electro-Optical Frequency Shifter," NASA's Jet Propulsion Laboratory, 2000; Available at <URL:http://www.nasatech.com/Briefs/Sept00/NPO20531.html>.
Hu et al., "Imaging with Terahertz Waves," *Optics Letters*, 1995; 20(16):1716-1718.
Hunsche et al., "Terahertz 'T-Ray' Tomography," *Proc. SPIE Int. Millimeter Submillimeter Waves Applicat. IV.*, 1998; 50(3):426-433.
Izutsu et al., "Integrated Optical SSB Modulator/Frequency Shifter," *IEEE Journal of Quantum Electronics*, Nov. 1981, QE-17:2225-2227.
Janke et al., "Asynchronous Optical Sampling for High-Speed Characterization of Integrated Resonant Terahertz Sensors," *Optics Letters*, 2005; 30(11):1405-1407.
Jiang et al., "Terahertz Imaging via Eletrooptic Effect," *IEEE Trans. Microwave Theory Tech.*, 1999; 47:2644-2650.
Logan, Jr. et al., "Field Portable THz Spectrometer for Characterization of Explosives and Chemicals," Emcore Corporation Conference Publication, Oct. 2011; 3 pgs.
McGrath et al., "Superconductive Hot Electron Mixers with Ultra Wide RF Bandwidth for Heterodyne Receiver Applications Up to 3 THz," *Proceedings of the ESA Symposium*, 1997; pp. 401-404.
McIntosh et al., "Terahertz Measurements of Resonant Planar Antennas Coupled to Low-Temperature-Grown GaAs Photomixers," *Appl. Phys. Lett.*, 1996; 69(24):3632-3634.
Mittleman et al., "T-Ray Imaging," *IEEE J. Select. Topics Quantum Electron*, 1996; 2:679-692.
Saleh et al., "Fundamentals of Photonics," Wiley-Interscience, 1991; pp. 719-720, 823-825.
Siegel, "Terahertz Technology," *IEEE Transactions on Microwave Theory and Techniques*, 2002; 50(3):915-917.
Verghese et al., "Generation and Detection of Coherent Terahertz Waves Using Two Photomixers," *Applied Physics Letters*, 1998; 73(26):3824-3826.
Wu et al., "Two-Dimensional Electro-Optic Imaging of THz Beams," *Appl. Phys. Lett.*, 1996; 69(8):1026-1028.
Yasui et al., "Terahertz Frequency Comb by Multifrequency-Heterodyning Photoconductive Detection for High-Accuracy, High Resolution Terahertz Spectroscopy," *Applied Physics Letters*, 2006; 88(241104):1-3.

* cited by examiner

TERAHERTZ SPECTROMETER PHASE MODULATOR CONTROL USING SECOND HARMONIC NULLING

CROSS-REFERENCE TO RELATED APPLICATION

This application claims the benefit of U.S. Provisional Patent Application Ser. No. 61/789,234 filed on Mar. 15, 2013, which is incorporated by reference herein in its entirety.

BACKGROUND

One of the difficulties when generating a terahertz signal by using a difference frequency between two continuous-wave optical signals mixed on a photoconductive switch and then detecting this terahertz signal using another photoconductive switch illuminated by the same two optical signals is the creation of a fringe pattern where the detected signal periodically goes through nulls as the terahertz wavelength is swept. This fringe pattern is the result of a path length difference between the detected terahertz signal and the local-oscillator terahertz signal generated in the receiving photoconductive switch. The fringe pattern can be eliminated by making the path length difference zero, but unfortunately this may give rise to excessive noise as the system as the phase noise of the lasers becomes correlated. To avoid this excessive noise, it would be desirable to maintain the path length difference but find some other way to prevent the nulls that occur periodically during a terahertz sweep.

SUMMARY

One possible way is to prevent the nulls is to use an optical phase modulator in one of the arms of the system such that the phase of the either the transmitted or local-oscillator terahertz signal can be controlled such that the two terahertz signals are always in phase when they beat together in the detecting photoconductive switch, thereby avoiding the nulls that occur when the two terahertz signals become 90 degrees out of phase relative to one another.

In order to maintain an in-phase relationship between the two terahertz signals, it is necessary to have some way to of measuring their phase relationship. The method described herein uses a phase modulator that is modulated by a low-frequency waveform in such a way that the terahertz signal is swept back and forth across a fringe between the +180 degree and −180 degree points. The resulting positive and negative excursions in the signal coming from the receiving photoconductive switch are detected using a lock-in amplifier with the low-frequency waveform as its reference input. The output of this lock-in amplifier will provide the amplitude measurement of the detected terahertz signal. Because the reference input to this lock-in amplifier is at the same frequency as the signal that it is detecting, it is referred to as the 1f Lock-In Amplifier.

A feature of the proposed system is the use of a second lock-in amplifier channel that detects the second harmonic of the low-frequency waveform. This second detection path is referred to as the 2f Lock-In Amplifier. It will be shown herein that when the two terahertz signals are in phase with one another, the second harmonic is zero. If the two terahertz signals are not in phase, then the second harmonic lock-in output will have either a positive or negative value that can be used as an error signal to adjust the DC bias of the phase modulator and maintain operation of the phase modulator at the optimum point where the two terahertz signals are always in phase. In this way, a swept terahertz spectrometer measurement can be made without any nulls from the fringe pattern that in present systems places a limit on the resolution capabilities of the instrument.

One exemplary apparatus for analyzing, identifying, or imaging a target may include a first laser configured to provide a first output beam at a first frequency and a second laser configured to provide a second output beam at a second frequency. The second frequency may be different than the first frequency. The apparatus may further include a source configured to receive a first optical input beam based on a first portion of the first output beam and a first portion of the second output beam and to illuminate the target with an interrogation output beam based on the first optical input beam and a detector configured to receive a second optical input beam based on a second portion of the first output beam and a second portion of the second output beam and to generate an output signal based on the second optical input beam and electromagnetic radiation from the target resulting from the interrogation output beam. The apparatus may further include a phase modulator configured to modulate the phase of one of the second portion of the first output beam and the second portion of the second output beam using a reference signal at a low frequency and a second harmonic lock-in amplifier electrically coupled to the detector to receive the output signal. The second harmonic lock-in amplifier may be configured to generate, based on the second harmonic of the reference signal and the output signal, an error signal used to adjust a DC bias of the phase modulator to maintain an in-phase relationship between the first optical input beam and the second optical input beam to avoid nulls in the output signal during frequency sweeping.

In at least one embodiment, the apparatus may further include a DC driver electrically coupled to the phase modulator and configured to adjust the DC bias voltage of the phase modulator to modulate the phase of one of the second portion of the first output beam and the second portion of the second output beam and an integrator electrically coupled to the DC driver and the second harmonic lock-in amplifier. The integrator may be configured to receive the error signal from the second harmonic lock-in amplifier to adjust the phase modulator DC bias voltage.

In at least one embodiment, the apparatus may further include a reference signal source configured to provide the reference signal and electrically coupled to the second harmonic lock-in amplifier. Further, the apparatus may further include a waveform shaping circuit electrically coupled to the reference signal source for receiving the reference signal and converting the reference signal to a waveform defining slower transitions between maximum and minimum amplitudes than the reference signal and an AC driver electrical coupled to the phase modulator and to the waveform shaping circuit for receiving the converted reference signal to generate an output voltage swing that modulates the phase modulator to produce a peak-to-peak optical phase shift of 180 degrees.

In at least one embodiment, the apparatus may further include a first harmonic lock-in amplifier electrically coupled to the detector to receive the output signal and configured to provide an locked-in output signal based on the first harmonic of the reference signal and the output signal for use in amplitude measurement for analyzing, identify, or imaging the target.

In at least one embodiment, the apparatus may further include a DC source electrically coupled to the source to electrically bias the source with a selected fixed DC bias.

In at least one embodiment, the apparatus may further include a low-noise amplifier electrically coupled to the detector for amplifying the output signal and electrically coupled to the second harmonic lock-in amplifier to deliver the amplified output signal.

In at least one embodiment, the apparatus may further include a first beam splitter optically coupled to the first laser and configure to provide the first portion of the first beam and the second portion of the first beam, a second beam splitter optically coupled to the second laser and configure to provide the first portion of the second beam and the second portion of the second beam, a first beam combiner optically coupled to the first beam splitter and the second beam splitter and configured to combine the first portion of the first beam and the first portion of the second beam to provide the first optical input beam, and a second beam combiner optically coupled to the first beam splitter and the second beam splitter and configured to combine the second portion of the first beam and the second portion of the second beam to provide the second optical input beam.

In at least one embodiment, the source may include a source photoconductive switch configured to generate a free-space signal based on at least the first optical input beam and collimating optics configured to collimate the free-space signal to provide the interrogation output beam. In at least one embodiment, the detector may include a detector photoconductive switch configured to receive the electromagnetic radiation and generate the output signal based on the second optical input beam and received electromagnetic radiation and focusing optics configured to collect and focus the electromagnetic radiation from the target resulting from the interrogation output beam to the detector photoconductive switch.

One exemplary apparatus for analyzing, identifying, or imaging a target may include a first laser configured to provide a first output beam at a first frequency and a second laser configured to provide a second output beam at a second frequency. The second frequency may be different than the first frequency. The apparatus may further include a source configured to receive a first optical input beam based on a first portion of the first output beam and a first portion of the second output beam and to illuminate the target with an interrogation output beam based on the first optical input beam and a detector configured to receive a second optical input beam based on a second portion of the first output beam and a second portion of the second output beam and to generate an output signal based on the second optical input beam and electromagnetic radiation from the target resulting from the interrogation output beam. The apparatus may further include a phase modulator configured such that the DC bias of the phase modulator is adjusted to modulate the phase of the second portion of the first output beam to maintain an in-phase relationship between the first optical input beam and the second optical input beam to avoid nulls in the output signal output beam during frequency sweeping.

One exemplary method for analyzing, identifying, or imaging a target may include providing a first output beam at a first frequency and a second output beam at a second frequency (e.g., the second frequency may be different than the first frequency), illuminating the target with an interrogation output beam based on a first portion of the first output beam and a first portion of the second output beam, and generating an output signal based on electromagnetic radiation from the target resulting from the interrogation output beam and a second portion of the first output beam and a second portion of the second output beam. The output signal may be used to analyze, identify, or image the target. The exemplary method may further include modulating the second portion of the second output beam by a low-frequency waveform such that a terahertz signal is swept back and forth across a fringe between the +180 degree and −180 degree points and adjusting a DC bias of the modulation of the second portion of the second output beam to maintain an in-phase relationship to avoid nulls in the output signal output beam during frequency sweeping.

In at least one embodiment, the method may further include detecting the second harmonic of the output signal to generate an error signal used to adjust a DC bias. In at least one embodiment, the method may further include detecting the first harmonic of the output signal resulting from the modulation for use in amplitude measurement for analyzing, identify, or imaging the target.

DETAILED DESCRIPTION OF EXEMPLARY EMBODIMENTS

Figure 1:
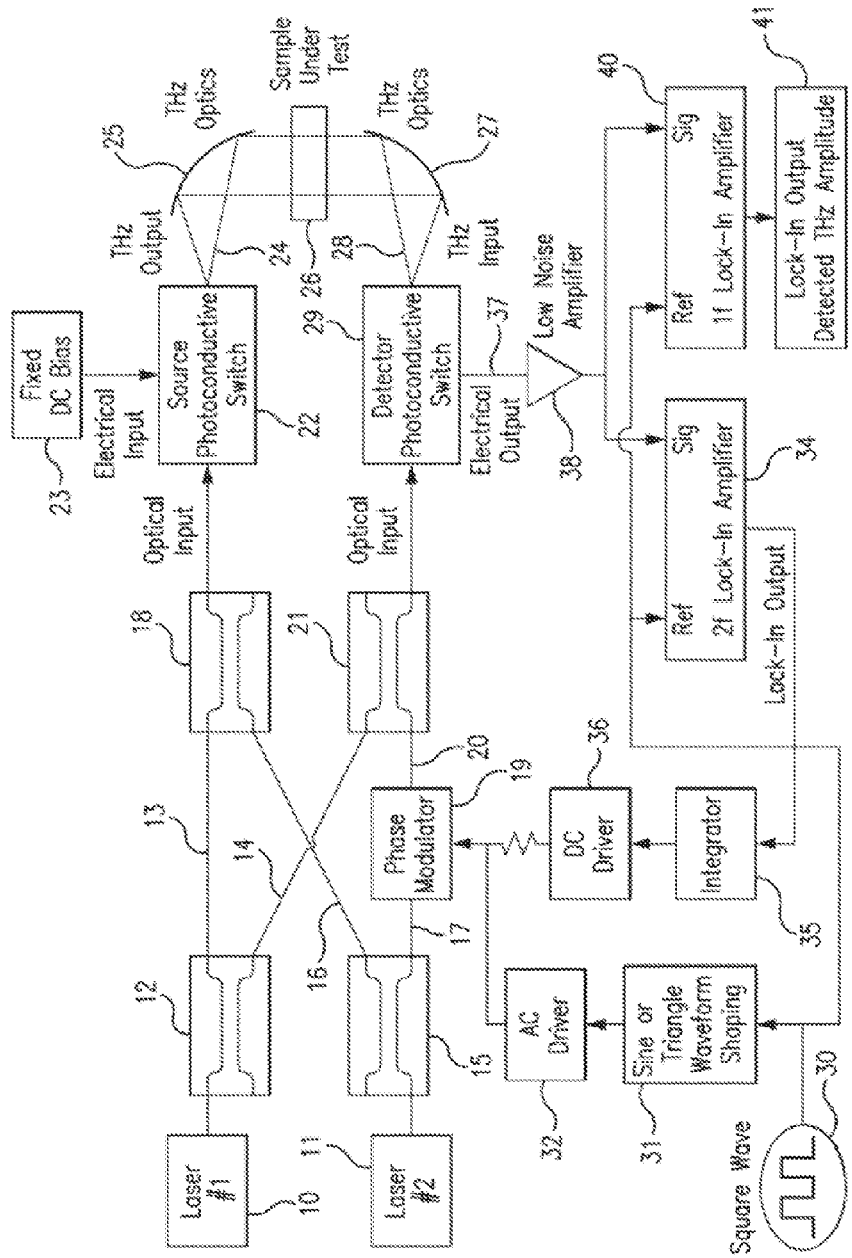
FIG. 1 is a block diagram of an exemplary system.

A block diagram of the proposed system is shown in FIG. 1. Two single-frequency semiconductor lasers 10, 11 operating closely-spaced wavelengths are mixed together on photoconductive switches to generate a difference frequency in the terahertz range. The exact wavelengths of the lasers 10, 11 are controlled using temperature tuning (not shown). The output of laser 10 is split into two optical fibers 13, 14 using an optical splitter 12. The output of laser 11 is split into two optical fibers 16, 17 using an optical splitter 15. The two laser signals are combined using two optical combiners 18, 21 with one arm of each combiner 18, 21 connected to either the Source Photoconductive Switch 22 or the Detector Photoconductive Switch 29. One arm 17 of the Laser #2 splitter 15 passes through an optical phase modulator 19 before going to the optical combiner 21 using optical fiber 20.

The Source Photoconductive Switch 22 is biased with a fixed DC voltage 23. The two lasers 24 illuminating the Source Photoconductive Switch 22 create a beat pattern producing a combined optical amplitude that varies at a rate given by the difference in the two optical frequencies. This varying optical amplitude causes the resistance of the Source Photoconductive Switch 22 to vary at the difference frequency rate. If the difference frequency is in the terahertz range, then the current variations from the Source Photoconductive Switch 22 will flow through a connected spiral antenna (not shown) and generate a free-space terahertz output signal. The phase of this terahertz signal depends upon the relative phase of the two lasers signals 24 at the point where they illuminate the photoconductive switch 22. The free-space terahertz signal is collimated by terahertz optics 25, passes through a sample of some material 26 whose terahertz properties are to be measured, and is focused by another set of terahertz optics 27 onto the Detector Photoconductive Switch 29.

The Detector Photoconductive Switch 29 is illuminated by the same two lasers 28 as the Source Photoconductive Switch 22, hence its resistance also varies at the same terahertz rate. The spiral antenna of the Detector Photoconductive Switch 29 receives the incoming terahertz signal from the terahertz optics 27 and produces a small electrical terahertz voltage across the Detector Photoconductive Switch 29. This voltage results in a current in the switch 29 that depends upon the both on the product of the voltage and the instantaneous conductivity of the switch 29. Because the conductivity is modulated by the optical field of the two lasers 28 illuminating the switch 29, the result is a homodyne mixing of the locally-generated terahertz signal and the incoming terahertz signal from the terahertz optics 27. The mixing product shows up in the low-frequency electrical output 37 from the Detector Photoconductive Switch 29. This electrical output is amplified by a low noise amplifier 38 and detected by the 1f and 2f Lock-In Amplifiers 34, 40, respectively.

The purpose of the 2f Lock-In Amplifier 34 is to generate an error signal that is used to control the DC operating point of the phase modulator 19. The output of the 2f Lock-In Amplifier 34 goes to an Integrator 35 followed by a DC Driver 36 and then through a resistor to the electrical input of the phase modulator 19. Operation of the 2f lock-in detection is described herein.

The Phase Modulator 19 is driven by both a capacitively-coupled AC signal and a resistively-coupled DC signal. The AC signal originates as a square wave 30 at a relatively low frequency of perhaps a few kilohertz. This square wave signal drives 30 a Waveform Shaping circuit 31 that converts it into either a triangle wave or a sine wave that has slower transitions between maximum and minimum values than the input square wave (other waveforms are possible as well). For ease of explanation, a triangle wave is used. The triangle wave drives an AC Driver circuit 32 whose output voltage swing is adjusted so that it modulates the phase modulator 19 to produce a peak-to-peak optical phase shift of exactly 180 degrees. This will result in the locally-generated terahertz signal at the Detector Photoconductive Switch 29 also having a periodic phase shift of 180 degrees peak-to-peak. If the phases of the locally-generated terahertz signal and the incoming terahertz signal from the terahertz optics are optimized relative to one another such they are either exactly in phase or 180 degrees out of phase at the Detector Photoconductive Switch 29 during the peaks of the triangle wave, then the output current from the Detector Photoconductive Switch 29 will have a maximum-valued AC component synchronized to the triangle wave. This condition is illustrated in FIG. 2.

Figure 2:
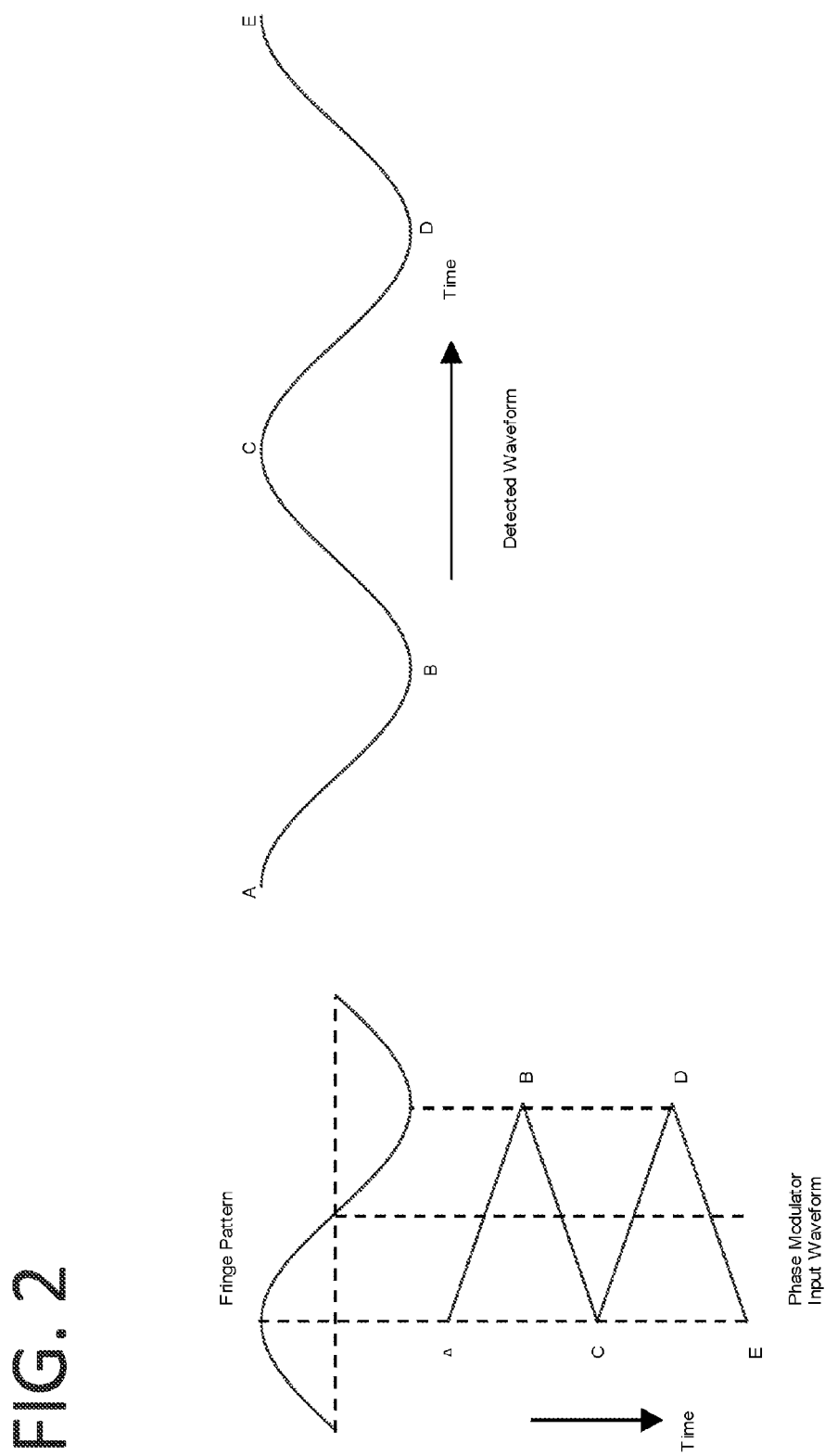
FIG. 2 is graph depicting phase modulation centered on fringe zero

The one-cycle sinusoidal waveform in the upper left of FIG. 2 is a fringe pattern that represents the phase relationship between the locally-generated terahertz signal and the incoming terahertz signal as they are mixed at the Detector Photoconductive Switch 29. When this fringe pattern is at its maximum the two terahertz signals are in phase, and when it is at its minimum the two terahertz signals are 180 degrees out of phase. When the two terahertz signals are 90 degrees out of phase with one another, the fringe pattern has a value of zero.

In FIG. 2, the DC bias voltage of the phase modulator 19 is set so that the center the modulating triangle wave (shown below the fringe pattern) corresponds to a zero of the fringe pattern and the peaks of the triangle wave correspond to either a maximum or minimum of the fringe pattern (180 degrees peak-to-peak phase shift). As the modulating voltage moves back and forth across the fringe pattern, it produces an output waveform at the electrical output of the Detector Photoconductive Switch 29 as shown to the right of the fringe pattern. Corresponding points in the input triangle wave and the output waveform are labeled A, B, C, etc. It can be seen that the output waveform is a sinusoid with the same number of cycles as the input waveform (two cycles each) and that there is no second harmonic content. For this phase modulator DC bias setting, the 1f Lock-In Amplifier 40 in FIG. 1 would have a maximum output value and the 2f Lock-In Amplifier 34 would have an output of zero.

Figure 3:
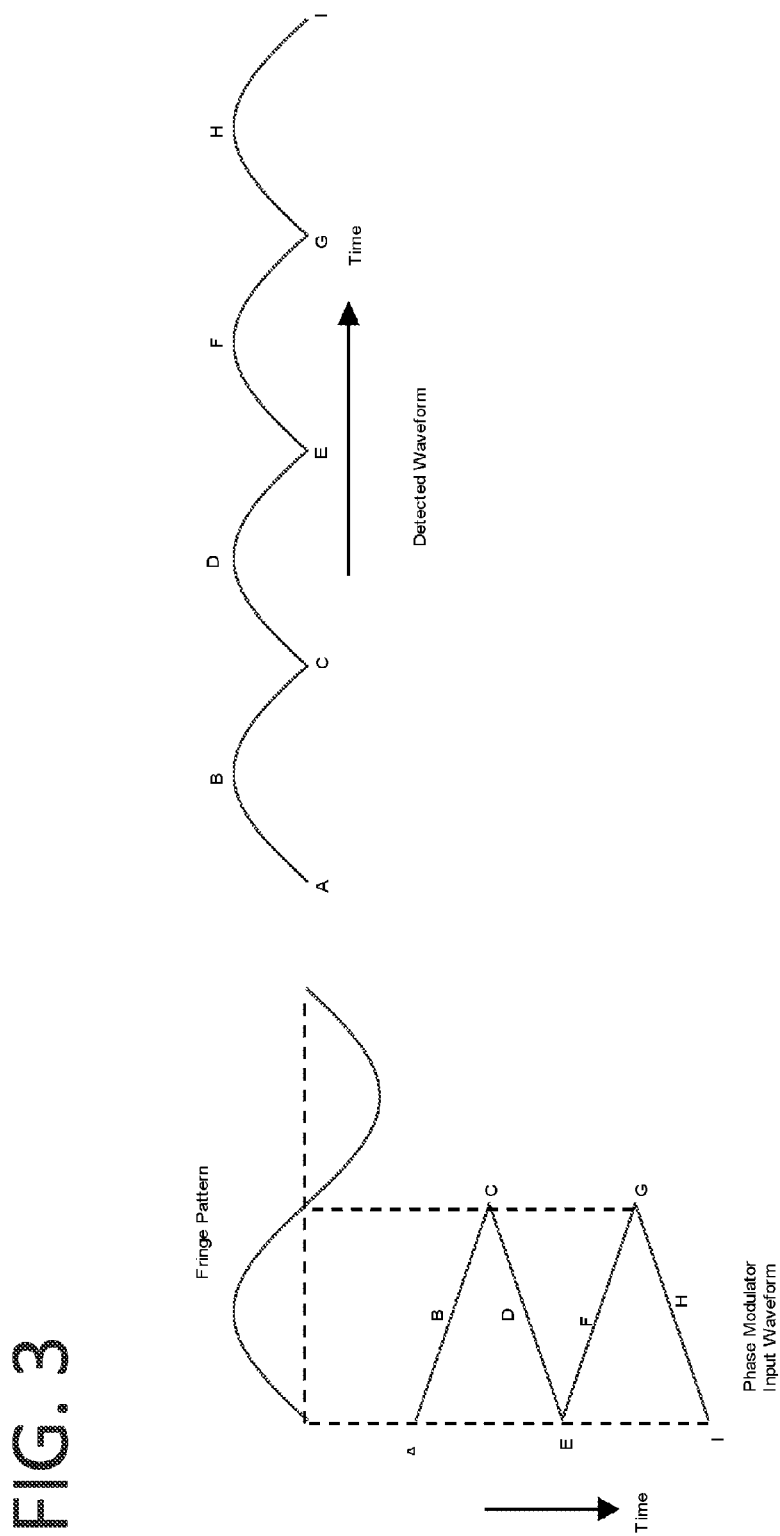
FIG. 3 is graph depicting phase modulation centered on fringe positive peak

In this case depicted in FIG. 3, the phase modulator DC bias is adjusted so that the triangle wave modulation is centered on a positive peak of the fringe pattern, i.e. the overall phase is shifted −90 degrees relative to FIG. 2. The detected waveform to the right is now a rectified sine wave as can be seen from the correspondence between points A, B, C, etc., on the input and output waveforms. The number of cycles in the output waveform is now four while the input waveform consists of only two cycles. There is no first harmonic content in the output waveform, so the 1f Lock-In Amplifier 40 would have an output of zero whereas the 2f Lock-In Amplifier 34 would have a maximum positive output because of the large second harmonic content in the output waveform.

Figure 4:
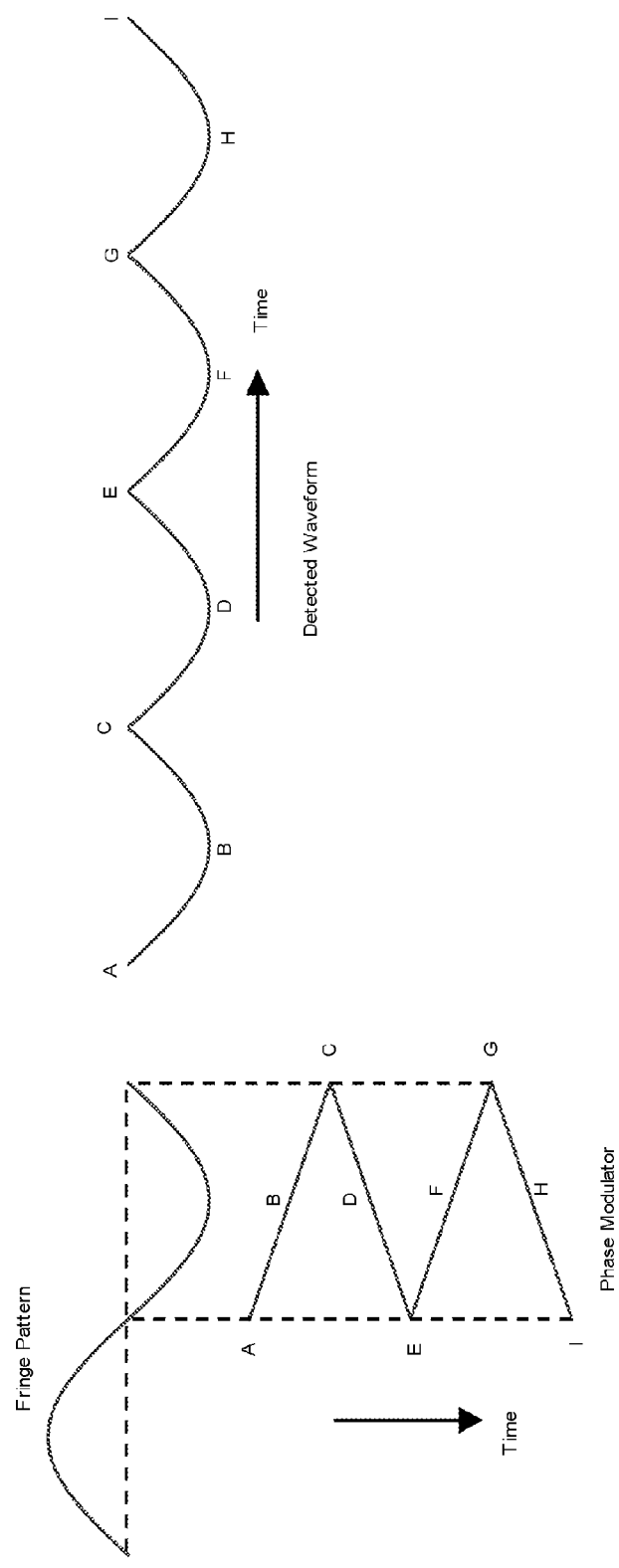
FIG. 4 is graph depicting phase modulation centered on fringe negative peak

A third case to be considered is shown in FIG. 4. In this case, the phase modulator DC bias is adjusted so that the triangle wave modulation is centered on a negative peak of the fringe pattern, i.e. the overall phase is shifted +90 degrees relative to FIG. 2. The detected waveform to the right is again a rectified sine wave as can be seen from the correspondence between points A, B, C, etc., on the input and output waveforms, however the waveform is inverted relative to the one in FIG. 3. The number of cycles in the output waveform is again four while the input waveform consists of two cycles. There is no first harmonic content in the output waveform, so the 1f Lock-In Amplifier 40 would again have an output of zero whereas the 2f Lock-In Amplifier 34 would have a maximum negative output.

Figure 5:
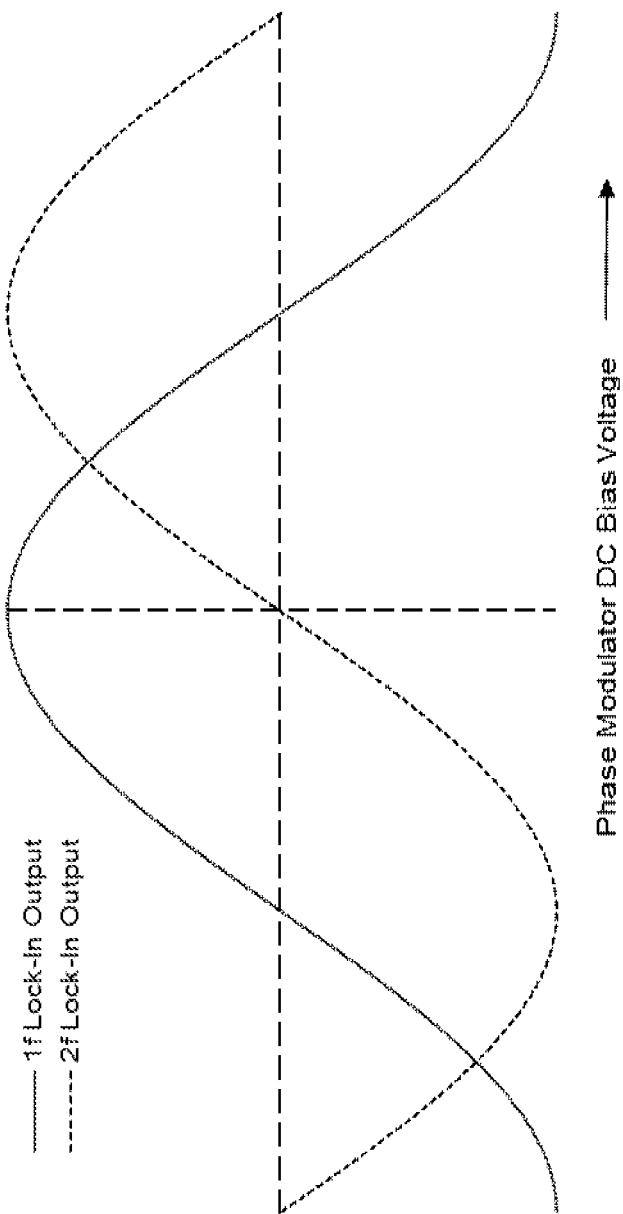
FIG. 5 is graph depicting 1f and 2f lock-in amplifier outputs versus phase modulator DC bias voltage.

The outputs of the 1f and 2f Lock-In Amplifiers 40, 34 as the phase modulator DC bias voltage is varied are shown in FIG. 5. It can be seen that the 1f Lock-In Amplifier output 41, which is proportional to the amplitude of the signal at the terahertz input of the Detector Photoconductive Switch 29, is maximized when the 2f Lock-In Amplifier 34 output is zero. In addition, the 2f Lock-In Amplifier 34 output goes positive or negative depending on whether or not the phase modulator DC bias voltage is above or below the value where the 1f Lock-In Amplifier output 41 is maximized. The 2f Lock-In Amplifier 34 output can therefore be used as an error signal inside a control loop that keeps the phase modulator DC bias voltage at the optimum point where the 1f Lock-In Amplifier 40 output is maximized. This is accomplished in FIG. 1 by feeding the 2f Lock-In Amplifier 34 output into an integrator 35 followed by a DC driver 36 that sets the phase modulator DC bias voltage.

For this control loop to operate properly over a wide range of conditions it should have some additional properties. Firstly, it should be able to rapidly reset the phase modulator bias voltage in $2\pi$ increments if the voltage gets close to the maximum or minimum limits that either the DC driver circuit 36 or the phase modulator itself can handle. This will keep the phase modulator operating 19 point within acceptable limits. Ideally, the $2\pi$-reset threshold points should be set more than exactly $2\pi$ apart so that there will be hysteresis and the bias voltage will not jump back and forth in $2\pi$ increments multiple times.

Secondly, if the amplitude of the signal at the Detector Photoconductive Switch 29 drops below some acceptable level, then the control loop should perhaps be disabled or some other action taken to prevent random noise at the 2f Lock-In Amplifier 34 output from randomly changing the phase modulator bias voltage to some less-than-optimum value.

In summary, a terahertz spectrometer system using a phase modulator 19 is described herein in which lock-in detection of the second harmonic of the reference signal is used to control the DC operating point of the phase modulator such that periodic nulls in the spectrometer output during frequency sweeping can be eliminated.

The invention claimed is:

1. An apparatus for analyzing, identifying, or imaging a target, the apparatus comprising:
   a first laser configured to provide a first output beam at a first frequency;
   a second laser configured to provide a second output beam at a second frequency, wherein the second frequency is different than the first frequency;
   a source configured to receive a first optical input beam based on a first portion of the first output beam and a first portion of the second output beam and to illuminate the target with an interrogation output beam based on the first optical input beam;
   a detector configured to receive a second optical input beam based on a second portion of the first output beam and a second portion of the second output beam and to generate an output signal based on the second optical input beam and electromagnetic radiation from the target resulting from the interrogation output beam;
   a phase modulator configured to modulate the phase of one of the second portion of the first output beam and the second portion of the second output beam using a reference signal at a low frequency;
   a second harmonic lock-in amplifier electrically coupled to the detector to receive the output signal and configured to generate, based on the second harmonic of the reference signal and the output signal, an error signal used to adjust a DC bias of the phase modulator to maintain an in-phase relationship between the first optical input beam and the second optical input beam to avoid nulls in the output signal during frequency sweeping;
   a DC driver electrically coupled to the phase modulator and configured to adjust the DC bias voltage of the phase modulator to shift the phase of one of the second portion of the first output beam and the second portion of the second output beam; and
   an integrator electrically coupled to the DC driver and the second harmonic lock-in amplifier, wherein the integrator is configured to receive the error signal from the second harmonic lock-in amplifier to adjust the phase modulator DC bias voltage.

2. The apparatus of claim 1, the apparatus further comprising a reference signal source configured to provide the reference signal and electrically coupled to the second harmonic lock-in amplifier.

3. The apparatus of claim 1, the apparatus further comprising a DC source electrically coupled to the source to electrically bias the source with a selected fixed DC bias.

4. The apparatus of claim 1, the apparatus further comprising a low-noise amplifier electrically coupled to the detector for amplifying the output signal and electrically coupled to the second harmonic lock-in amplifier to deliver the amplified output signal.

5. The apparatus of claim 1, the apparatus further comprising:
   a first beam splitter optically coupled to the first laser and configure to provide the first portion of the first beam and the second portion of the first beam;
   a second beam splitter optically coupled to the second laser and configured to provide the first portion of the second beam and the second portion of the second beam;
   a first beam combiner optically coupled to the first beam splitter and the second beam splitter and configured to combine the first portion of the first beam and the first portion of the second beam to provide the first optical input beam; and
   a second beam combiner optically coupled to the first beam splitter and the second beam splitter and configured to combine the second portion of the first beam and the second portion of the second beam to provide the second optical input beam.

6. The apparatus of claim 1, wherein the source comprises:
   a source photoconductive switch configured to generate a free-space signal based on at least the first optical input beam; and
   collimating optics configured to collimate the free-space signal to provide the interrogation output beam,
   wherein the detector comprises:
   a detector photoconductive switch configured to receive the electromagnetic radiation and generate the output signal based on the second optical input beam and received electromagnetic radiation; and
   focusing optics configured to collect and focus the electromagnetic radiation from the target resulting from the interrogation output beam to the detector photoconductive switch.

7. An apparatus for analyzing, identifying, or imaging a target, the apparatus comprising:
   a first laser configured to provide a first output beam at a first frequency;
   a second laser configured to provide a second output beam at a second frequency, wherein the second frequency is different than the first frequency;
   a source configured to receive a first optical input beam based on a first portion of the first output beam and a first portion of the second output beam and to illuminate the target with an interrogation output beam based on the first optical input beam;
   a detector configured to receive a second optical input beam based on a second portion of the first output beam and a second portion of the second output beam and to generate an output signal based on the second optical input beam and electromagnetic radiation from the target resulting from the interrogation output beam;
   a phase modulator configured to modulate the phase of one of the second portion of the first output beam and the second portion of the second output beam using a reference signal at a low frequency;
   a second harmonic lock-in amplifier electrically coupled to the detector to receive the output signal and configured to generate, based on the second harmonic of the reference signal and the output signal, an error signal used to adjust a DC bias of the phase modulator to maintain an in-phase relationship between the first optical input beam and the second optical input beam to avoid nulls in the output signal during frequency sweeping;
   a waveform shaping circuit electrically coupled for receiving the reference signal and converting the reference signal to a waveform defining slower transitions between maximum and minimum amplitudes than the reference signal; and
   an AC driver electrically coupled to the phase modulator and to the waveform shaping circuit for receiving the converted reference signal to generate an output voltage swing that modulates the phase modulator to produce a peak-to-peak optical phase shift of 180 degrees.

8. An apparatus for analyzing, identifying, or imaging a target, the apparatus comprising:
   a first laser configured to provide a first output beam at a first frequency;

a second laser configured to provide a second output beam at a second frequency, wherein the second frequency is different than the first frequency;

a source configured to receive a first optical input beam based on a first portion of the first output beam and a first portion of the second output beam and to illuminate the target with an interrogation output beam based on the first optical input beam;

a detector configured to receive a second optical input beam based on a second portion of the first output beam and a second portion of the second output beam and to generate an output signal based on the second optical input beam and electromagnetic radiation from the target resulting from the interrogation output beam;

a phase modulator configured to modulate the phase of one of the second portion of the first output beam and the second portion of the second output beam using a reference signal at a low frequency;

a second harmonic lock-in amplifier electrically coupled to the detector to receive the output signal and configured to generate, based on the second harmonic of the reference signal and the output signal, an error signal used to adjust a DC bias of the phase modulator to maintain an in-phase relationship between the first optical input beam and the second optical input beam to avoid nulls in the output signal during frequency sweeping; and a first harmonic lock-in amplifier electrically coupled to the detector to receive the output signal and configured to provide a locked-in output signal based on the first harmonic of the reference signal and the output signal for use in amplitude measurement for analyzing, identify, or imaging the target.

9. An apparatus for analyzing, identifying, or imaging a target, the apparatus comprising:

a first laser configured to provide a first output beam at a first frequency;

a second laser configured to provide a second output beam at a second frequency, wherein the second frequency is different than the first frequency;

a source configured to receive a first optical input beam based on a first portion of the first output beam and a first portion of the second output beam and to illuminate the target with an interrogation output beam based on the first optical input beam;

a detector configured to receive a second optical input beam based on a second portion of the first output beam and a second portion of the second output beam and to generate an output signal based on the second optical input beam and electromagnetic radiation from the target resulting from the interrogation output beam; and a phase modulator configured such that the DC bias of the phase modulator is adjusted to modulate the phase of the second portion of the first output beam to maintain an in-phase relationship between the first optical input beam and the second optical input beam to avoid nulls in the output signal during frequency sweeping.

10. The apparatus of claim 9, wherein the apparatus further comprises a second harmonic lock-in amplifier electrically coupled to the detector to receive the output signal and configured to generate, based on the second harmonic of the reference signal and the output signal, an error signal used to adjust the DC bias of the phase modulator to maintain the in-phase relationship between the first optical input beam and the second optical input beam to avoid nulls in the output signal during frequency sweeping.

11. A method for analyzing, identifying, or imaging a target, the method comprising:

providing a first output beam at a first frequency and a second output beam at a second frequency, wherein the second frequency is different than the first frequency;

illuminating the target with an interrogation output beam based on a first portion of the first output beam and a first portion of the second output beam;

generating an output signal based on electromagnetic radiation from the target resulting from the interrogation output beam and a second portion of the first output beam and a second portion of the second output beam, wherein the output signal is used to analyze, identify, or image the target;

modulating the second portion of the second output beam by a low-frequency waveform such that a terahertz signal is swept back and forth across a fringe between the +180 degree and −180 degree points; and adjusting a DC bias of the modulation of the second portion of the second output beam to maintain an in-phase relationship to avoid nulls in the output signal during frequency sweeping.

12. The method of claim 11, the method further comprises detecting the second harmonic of the output signal to generate an error signal used to adjust a DC bias.

13. The method of claim 11, the method further comprising detecting the first harmonic of the output signal resulting from the modulation for use in amplitude measurement for analyzing, identify, or imaging the target.

* * * * *